United States Patent
Tao et al.

(10) Patent No.: US 12,177,933 B2
(45) Date of Patent: Dec. 24, 2024

(54) METHODS AND NODES FOR UE-TO-UE EVENT MONITORING

(71) Applicant: Telefonaktiebolaget LM Ericsson (publ), Stockholm (SE)

(72) Inventors: Jingrui Tao, Guangzhou (CN); Fengpei Zhang, Guangzhou (CN); Junjun Wang, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 584 days.

(21) Appl. No.: 17/427,818

(22) PCT Filed: Jan. 22, 2020

(86) PCT No.: PCT/CN2020/073860
§ 371 (c)(1),
(2) Date: Aug. 2, 2021

(87) PCT Pub. No.: WO2020/156460
PCT Pub. Date: Aug. 6, 2020

(65) Prior Publication Data
US 2022/0141648 A1    May 5, 2022

(51) Int. Cl.
*H04W 8/20* (2009.01)
*H04W 4/70* (2018.01)

(52) U.S. Cl.
CPC ............ *H04W 8/20* (2013.01); *H04W 4/70* (2018.02)

(58) Field of Classification Search
CPC ......... H04W 4/70; H04W 24/10; H04W 8/08; H04W 4/50; H04W 60/04; H04W 24/08;
(Continued)

(56) References Cited

U.S. PATENT DOCUMENTS

2016/0135143 A1   5/2016  Won et al.
2019/0028337 A1*  1/2019  Ryu ..................... H04W 8/02
(Continued)

FOREIGN PATENT DOCUMENTS

CN   106982425 A   7/2017
CN   108141727 A   6/2018
(Continued)

OTHER PUBLICATIONS

Author Unknown, "Technical Specification Group Services and System Aspects; Architecture enhancements to facilitate communications with packet data networks and application (Release 15)," Technical Specification 23.682, Version 15.4.0, Mar. 2018, 3GPP Organizational Partners, 124 pages.
(Continued)

*Primary Examiner* — Kwasi Karikari
(74) *Attorney, Agent, or Firm* — Weisberg I.P. Law, P.A.

(57) ABSTRACT

A network exposure node receives a reference identity for the network exposure node in a first monitoring message from a first network node. The network exposure node further retrieves, based on the reference identity for the network exposure node, an identity list of one or more subscriber UEs, which subscribed to monitoring of an event, and configuration information for the one or more subscriber UEs, which are stored in the network exposure node. The network exposure node then determines, based on the identity list and the configuration information, a second network node associated with a subscriber UE in the identity list. Next, the network exposure node transmits a report for the monitoring of the event in a second monitoring message to the determined second network node.

14 Claims, 5 Drawing Sheets

(58) Field of Classification Search
CPC ... H04W 8/24; H04W 88/02; H04W 28/0215; H04W 4/44; H04W 68/00; H04W 76/38
See application file for complete search history.

(56) References Cited

U.S. PATENT DOCUMENTS

| | | | |
|---|---|---|---|
| 2019/0028866 A1* | 1/2019 | Baek | H04W 4/08 |
| 2020/0029249 A1* | 1/2020 | Livanos | H04W 8/02 |

FOREIGN PATENT DOCUMENTS

| | | | |
|---|---|---|---|
| CN | 108282814 A | 7/2018 | |
| EP | 3386220 A1 | 10/2018 | |
| WO | 2014048334 A1 | 4/2014 | |
| WO | 2019232795 A1 | 12/2019 | |

OTHER PUBLICATIONS

Author Unknown, "Technical Specification Group Core Network and Terminals; T8 reference point for Northbound APIs (Release 15)," Technical Specification 29.122, Version 2.0.0, Jun. 2018, 3GPP Organizational Partners, 255 pages.

Ericsson, "S3-190314: New Key Issue: Subscription identifier exposure outside 3GPP network," 3GPP TSG SA WG3 (Security) Meeting #94, Jan. 28-Feb. 1, 2019, Kochi, India, 2 pages.

International Search Report and Written Opinion for International Patent Application No. PCT/CN2020/073860, mailed Mar. 26, 2020, 9 pages.

EPO Communication with Supplementary European Search Report dated Sep. 28, 2022 for Patent Application No. 20749356.0, consisting of 12 pages.

3GPP TR 23.789 V1.0.0; 3rd Generation Partnership Project; Technical Specification Group Services and System Aspects; Monitoring Enhancements (Release 13); Dec. 2014, consisting of 28 pages.

* cited by examiner

METHODS AND NODES FOR UE-TO-UE EVENT MONITORING

This application is a 35 U.S.C. § 371 national phase filing of International Application No. PCT/CN2020/073860, filed Jan. 22, 2020, which claims the benefit of International Application No. PCT/CN2019/074587, filed Feb. 2, 2019, the disclosures of which are incorporated herein by reference in their entireties.

FIELD OF THE INVENTION

The present disclosure generally relates to communication network, and more particularly, to user equipment (UE)-to-UE event monitoring.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing a non-Internet Protocol (IP) data delivery (NIDD) function over a service capability exposure function (SCEF) or network exposure function (NEF). And an event monitoring function via a SCEF (or a NEF) has been provided by the 3GPP. A home subscriber server (HSS), a unified data management (UDM), a mobile management entity (MME) or a serving general packet radio service (GPRS) support node (SGSN) detects a reporting of the monitoring event for a UE and transmits it to a service capability server/application server (SCS/AS) or application function (AF). There is no procedure description for UE-to-UE event monitoring communication. In this case, it may be desirable to improve the event monitoring in a more efficient manner.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The 3GPP technical specification 23.682 v15.3.0 (2017-12) (3GPP TS 23.682) has provided the event monitoring function in a 3GPP system to support a UE's report for the monitoring event over a SCEF (or NEF). However, the destination of the report of the monitoring event in the existing solution is limited to a SCS/AS (or AF). In this case, other UEs which expect receive the report of the monitoring event have to receive the report of the monitoring event via the SCS/AS (or AF). It introduces high complexity to the SCS/AS (or AF), extra latency, security risk for monitoring event data, and low efficient. Therefore, it may be desirable to improve the event monitoring.

Various embodiments of the present disclosure propose a solution of UE-to-UE event monitoring in a communication network, which can enable a source UE to transmit the report of the monitoring event to one or more subscriber UEs, which have subscribed to the monitoring event, in an efficient way. By using this way, the report of the monitoring event does not need to be transmitted via the SCS/AS (or AF) to the one or more subscriber UEs.

According to a first aspect of the present disclosure, there is provided a method performed by a network exposure node such as a SCEF (or a NEF), or any other suitable network function/entity which is able to support the event monitoring in the communication network. The method comprises receiving a reference identity for the network exposure node in a first monitoring message from a first network node, such as an MME/SGSN, an AMF or an HSS/UDM. The reference identity enables the network exposure node to retrieve an identity list of one or more subscriber UEs and configuration information for the one or more subscriber UEs based on the reference identity for the network exposure node. The subscriber UEs refer to the UEs which have subscribed to monitoring of an event. The identity list and the configuration information are stored by the network exposure node. The method further comprises determining a second network node (such as an MME/SGSN or an AMF) based on the identity list and the configuration information. The method further comprises transmitting a report for the monitoring of the event in a second monitoring message towards the determined second network node.

In accordance with an exemplary embodiment, the configuration information may comprise NIDD configuration information to enable the network exposure node to perform NIDD.

In accordance with an exemplary embodiment, the first monitoring message may comprise a monitoring indication or any other suitable message communicated between the first network node and the network exposure node.

In accordance with an exemplary embodiment, the second monitoring message may comprise a mobile terminated (MT) NIDD submit request, wherein the MT NIDD submit request may contain a light weight machine to machine (LwM2M) message which may contain the report for the monitoring of the event.

In accordance with an exemplary embodiment, the method may further comprise receiving the identity list and the configuration information from a server (such as a SCS/AS or an AF) in a first request message prior to receiving the reference identity for the network exposure node. The method may further comprise storing the identity list and the configuration information by the network exposure node.

In accordance with an exemplary embodiment, the first request message may comprise a monitoring request or any other suitable message communicated between the server and the network exposure node.

In accordance with an exemplary embodiment, the first network node is an MME/SGSN or an AMF, the method may further comprise transmitting the reference identity for the network exposure node in a second request message to the first network node to configure the monitoring event. The second request message may comprise a monitoring request or any other suitable message communicated between the first network node and the network exposure node.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus comprises a receiving unit, a retrieving unit, a determining unit and a transmitting unit. In accordance with some exemplary embodiments, the receiving unit is operable to carry out at least the receiving step of the method according to the first aspect of the present disclosure. The retrieving unit is operable to carry out at least the retrieving step of the method according to the first aspect of the present disclosure. The determining unit is operable to carry out at least the determining step of the method according to the first aspect of the present disclosure. The transmitting unit is operable to carry out at least the transmitting step of the method according to the first aspect of the present disclosure.

According to a fifth aspect of the present disclosure, there is provided a method performed by a server such as a SCS/AS (or an AF). The method comprises transmitting an identity list of one or more subscriber UEs which have subscribed to monitoring of an event of a UE, and configuration information for the one or more subscriber UEs to a network exposure node such as a SCEF (or a NEF).

In accordance with an exemplary embodiment, the configuration information may comprise NIDD configuration information to enable the network exposure node to perform NIDD.

According to a sixth aspect of the present disclosure, there is provided an apparatus. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a transmitting unit. The transmitting unit may be operable to carry out at least the transmitting step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
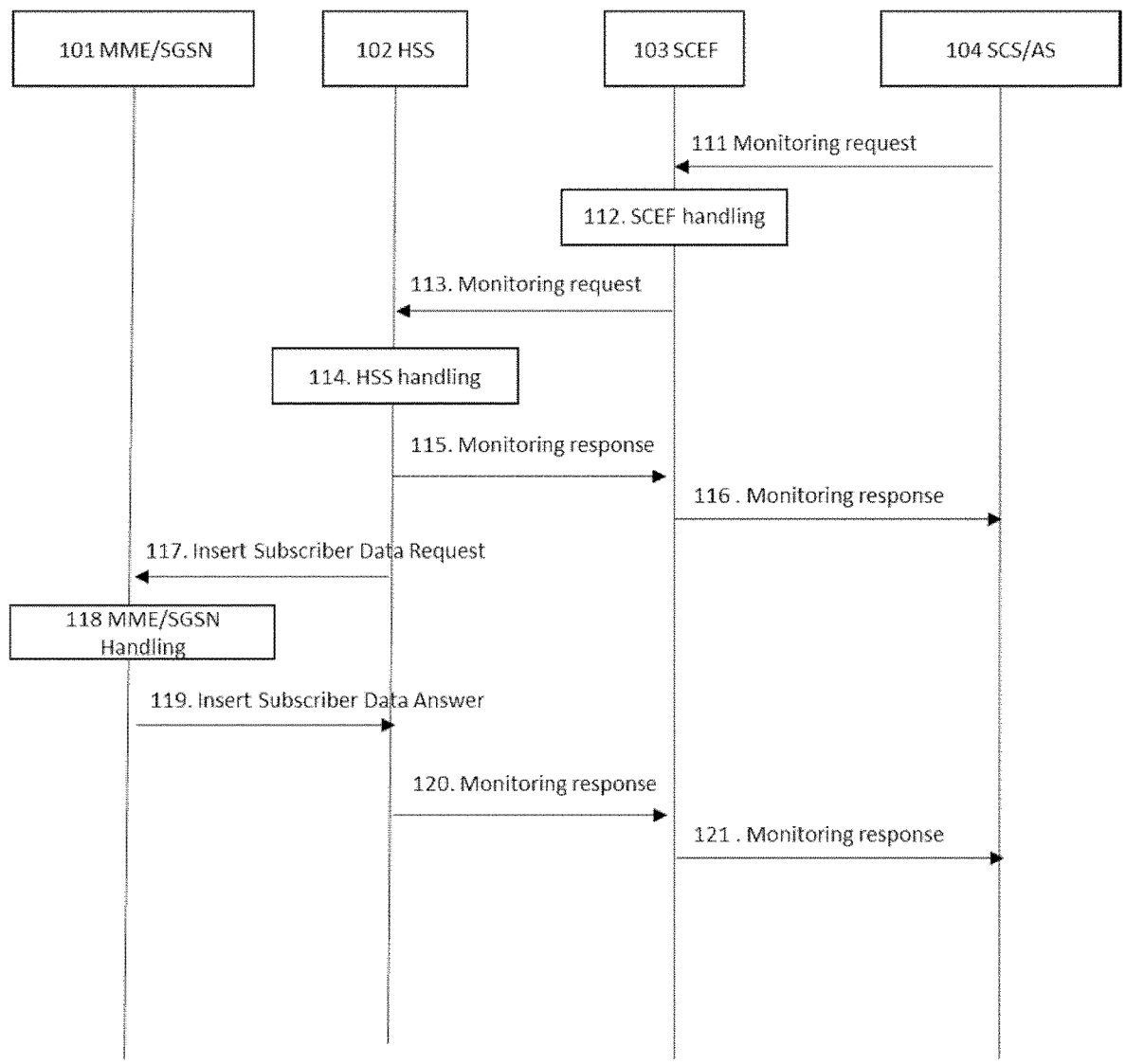
FIG. 1 is a diagram illustrating an example of UE-to-UE event monitoring configuration procedure according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication network may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following, different terms may refer to a same or similar network function or network node with the same or similar functionality in different communication networks. For example, the network exposure function may be called SCEF in 4G and NEF in 5G respectively. SCS/AS and AF used herein may refer to a network function or node with the same or similar functionality in 4G and 5G respectively. HSS and UDM used herein may refer to a network function or node with the same or similar functionality in 4G and 5G respectively. MME and AMF used herein may refer to a network function or node with the same or similar functionality in 4G and 5G respectively. Thus, the specific terms used herein do not limit the present disclosure only to the communication network related to the specific terms, which however can be more generally applied to other networks.

To meet dramatically increasing network requirements on Internet of Things (IoT), a NIDD over a SCEF (or a NEF), particularly an event monitoring method which is intended for monitoring of specific events has been supported by the 3GPP specifications (e.g. TS 23.682 v15.3.0 (2017-12)). However, as mentioned above, the problem of the existing method is that the destination of the report of the monitoring event is limited to a SCS/AS (or an AF). The consequence is that the UEs which expect receive the report of the monitoring event have to receive such report of the monitoring event via the SCS/AS (or AF). The present disclosure proposes a direct UE-to-UE event monitoring method in more efficient manner.

In order to improve the UE-to-UE event monitoring efficiency, embodiments of the present disclosure propose a solution to support UE-to-UE event monitoring without the SCS/AS (or AF), so that the reporting of the monitoring event for a UE can be transmitted to the subscriber UEs directly. According to the proposed solution, a server such as the SCS/AS (or AF) can configure an identity list of subscriber UEs which have subscribed to monitoring of an event of a source UE towards the network exposure node such as the SCEF (or NEF), e.g. by a monitoring request message. The server can also configure NIDD configuration information towards the network exposure node by the monitoring request message to enable the network exposure node to perform the NIDD function. Upon receiving the identity list and the NIDD configuration information, the network exposure node can store the received identity list and the NIDD configuration information and configure a reference identity for the network exposure node to an HSS (or a UDM) by the monitoring request message. The HSS (or UDM) may then configure the reference identity for the network exposure node towards the MME/SGSN (or AMF). The SCEF (or NEF) can receive the reporting of monitoring event from the MME/SGSN (or AMF) or the HSS (or UDM) by a monitoring indication message with the reference identity and retrieve the identity list and the NIDD configuration information based on the received reference identity. Then, the SCEF (or NEF) may determine a subscriber MME/SGSN (or AMF) associated with a subscriber UE in the identity list, so that the SCEF (or NEF) can transmit the reporting of the monitoring event to the subscriber UE via the determined subscriber MME/SGSN (or AMF).

It is noted that some embodiments of the present disclosure are mainly described in relation to LTE specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments and does naturally not limit the present disclosure in any way. Rather, any other system configuration or radio technologies may equally be utilized as long as exemplary embodiments described herein are applicable.

FIG. 1 is a diagram illustrating an example of UE-to-UE event monitoring configuring procedure according to some embodiments of the present disclosure. For simplicity, FIG. 1 only depicts some exemplary elements such as SCEF 103 and SCS/AS 104. It will be appreciated that signaling messages and network elements shown in FIG. 1 is just an example, and more or less alternative signaling messages and network elements may be involved in the event monitoring according to the embodiments of the present disclosure.

According to the exemplary embodiment as described with respect to FIG. 1, the SCS/AS 104 transmits 111 monitoring request to SCEF 103, the monitoring request comprises an identity list of the subscriber UEs which have subscribed to monitoring of an event of a source UE and NIDD configuration information which enables the SCEF 103 to perform NIDD.

In accordance with the exemplary embodiment, SCEF 103 stores the received identity list and the NIDD configuration information as step 112 SCEF handling in FIG. 1. The identity list and the NIDD configuration information may be retrieved and used in the event monitoring reporting procedure as showed in FIG. 2.

Then, SCEF 103 can transmit 113 monitoring request to HSS 102, the monitoring request comprises a reference identity for SCEF 103. The SCEF 103 receives 115 a monitoring response from the HSS 102 to acknowledge that HSS 102 has handled the reference identity successfully as shown in 114 as HSS handling. Then SCEF 103 transmits 116 a monitoring response to SCS/AS 104 to acknowledge the event monitoring configuration procedure is successful. Alternatively or additionally, HSS 102 may further transmit the reference identity for SCEF 103 to MME/SGSN 101 via 117 an insert subscriber data request to configure MME/SGSN 101. HSS 102 receives 119 an insert subscriber data answer from MME/SGSN 101 indicating that MME/SGSN 101 has handled the reference identity successfully as shown in 118 as MME/SGSN handling. HSS 102 then transmits 121 a monitoring response to SCS/AS 104 via SCEF 103 with a message of 120 monitoring response to acknowledge the event monitoring configuration procedure is successful. The reference identity for SCEF 103 may be used to associate the source UE with the identity list and the NIDD configuration information stored in the SCEF 103 as shown in FIG. 2.

Figure 2:
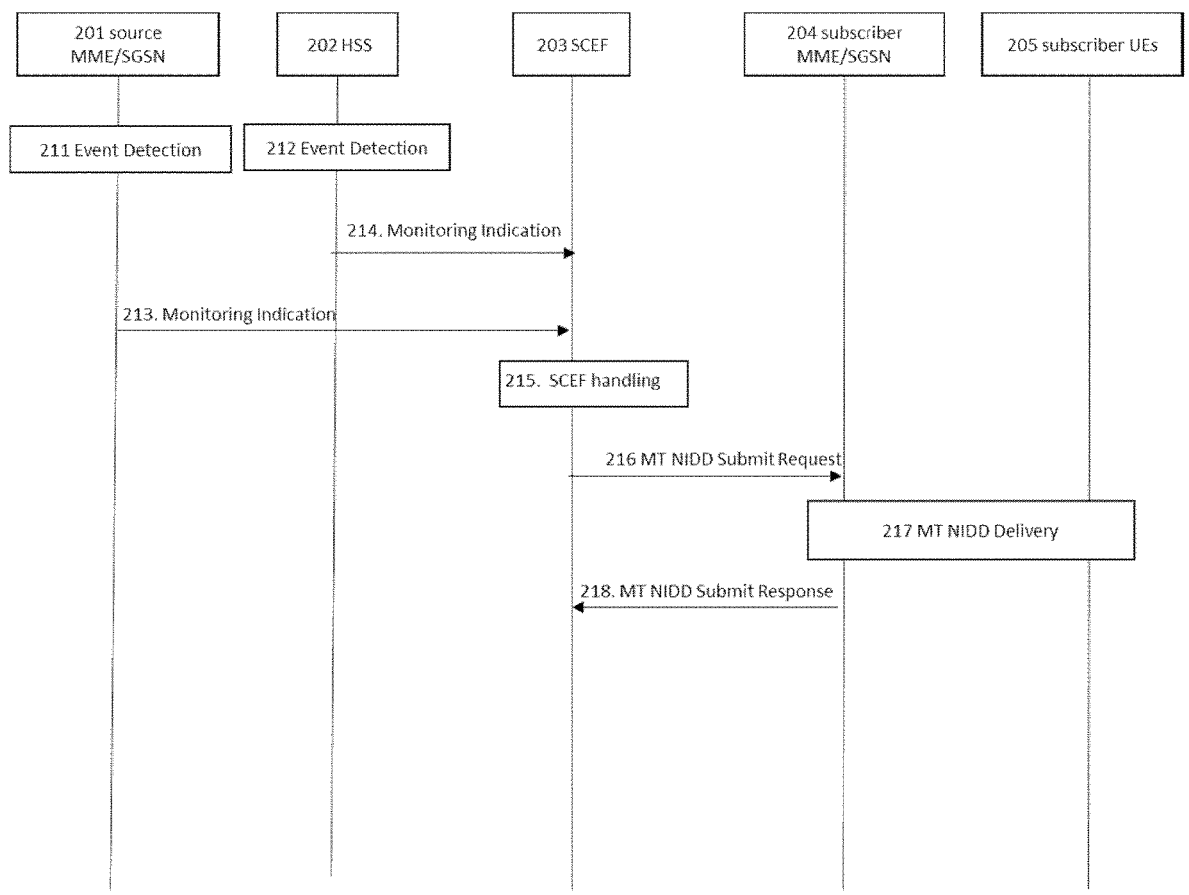
FIG. 2 is a diagram illustrating an example of UE-to-UE event monitoring reporting procedure according to some embodiments of the present disclosure.

FIG. 2 is a diagram illustrating an example of UE-to-UE event monitoring reporting procedure according to some embodiments of the present disclosure. For simplicity, FIG. 2 only depicts some exemplary elements such as source MME/SGSN 201, HSS 202, SCEF 203, subscriber MME/SGSN 204 and SCS/AS 205. It will be appreciated that signaling messages and network elements shown in FIG. 2 is just an example, and more or less alternative signaling messages and network elements may be involved in the event monitoring according to the embodiments of the present disclosure.

The source MME/SGSN 201 mentioned here refers to an MME/SGSN from which a message for reporting of monitoring event is transmitted. The subscriber MME/SGSN mentioned here refers to an MME/SGSN associated with the one or more subscriber UEs which have subscribed to monitoring of an event of a source UE. The message of the reporting of monitoring event is transmitted to the subscriber UEs via the subscriber MME/SGSN.

According to the exemplary embodiment as described with respect to FIG. 2, the source MME/SGSN 201 may detect that a monitoring event happens as shown in 211 as event detection and transmits 213 monitoring indication to SCEF 203. Alternatively, HSS 202 may also detect that a monitoring event happens as shown in 212 as event detection and transmits 214 monitoring indication to the SCEF 203. The monitoring indication contains the reference identity for the SCEF 203. The SCEF 203 can retrieve an identity list of subscriber UEs which have subscribed to the monitoring of the event and NIDD configuration information based on the reference identity for SCEF 203 and then determine, based on the identity list and the NIDD configuration information, an MME/SGSN associated with a subscriber UE in the identity list as shown in 215 as SCEF handling. Further, SCEF 203 transmits 216 MT NIDD submit request to subscriber MME/SGSN 204 and then transmit 217 to the subscriber UE 205 by a message of MT NIDD delivery. SCEF 203 receives 218 MT NIDD submit response from subscriber MME/SGSN 204 indicating that subscriber UEs 205 have received monitoring message successfully.

As described previously, the proposed solution according to one or more exemplary embodiments can improve event monitoring communication by enabling a UE to transmit the reporting of monitoring event to the subscriber UEs without the SCS/AS. Advantages of the proposed solution according to some embodiments may include enabling the UE-to-UE event monitoring more efficient and enhancing network resource utilization.

Figure 3:
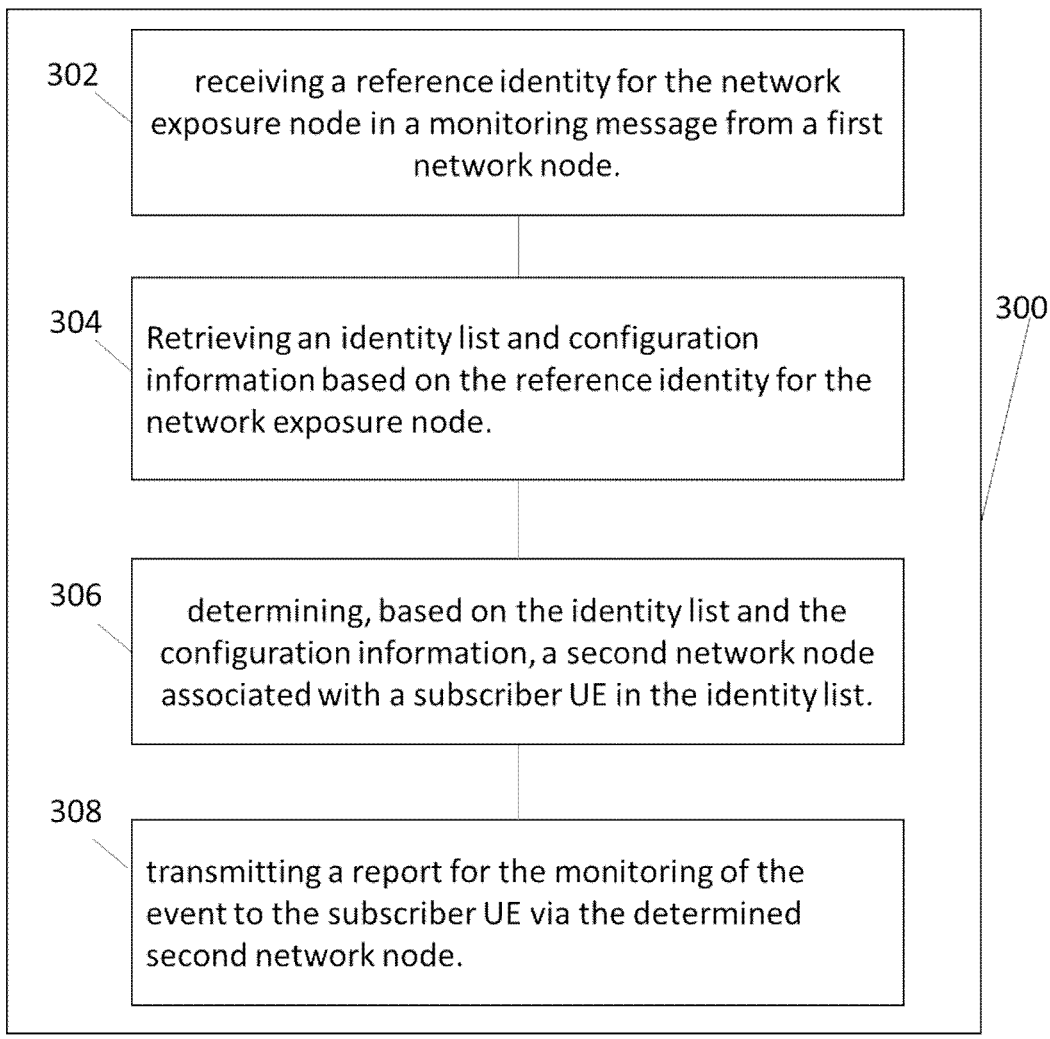
FIG. 3 is a flowchart illustrating a method according to an embodiment of the present disclosure.

FIG. 3 is a flowchart illustrating a method 300 according to some embodiments of the present disclosure. The method 300 illustrated in FIG. 3 may be performed by a network exposure node or an apparatus communicatively coupled to the network exposure node. In accordance with an exemplary embodiment, the network exposure node may be an SCEF (such as the SCEF 103, 203), a NEF, or any other suitable network node that can facilitate the UE-to-UE event monitoring.

According to the exemplary method 300 illustrated in FIG. 3, the network exposure node receives a reference identity for the network exposure node in a first monitoring message from a first network node, such as the source MME/SGSN 201, (or AMF), the HSS 202 (or UDM), as shown in block 302. According to some exemplary embodiments, the first monitoring message may be a monitoring indication or any other proper message which can report the monitoring event between the first network node and the network exposure node.

Then in block 304, the network exposure node retrieves an identity list of one or more subscriber UEs and configuration information for the one or more subscriber UEs based on the reference identity for the network exposure node. The subscriber UEs refer to the UEs which have subscribed to monitoring of an event of a UE. The identity list and the configuration information are stored by the network exposure node. In an exemplary embodiment, the configuration information may be NIDD configuration information which enables the network exposure node to perform NIDD.

In an exemplary embodiment, prior to receiving the reference identity for the network exposure node from the first network node, the network exposure node receives the identity list and the configuration information in a first request message from a server, such as SCS/AS (or AF), and stores the identity list and the configuration information locally in the network exposure node or in a memory connected with the network exposure node. According to some exemplary embodiments, the first request message may be a monitoring request or any other proper message communicated between the server and the network exposure node.

Then in block 306, the network exposure node determines, based on the identity list and the configuration information, a second network node, such as a subscriber MME/SGSN 204 (or AMF), associated with a subscriber UE in the identity list. In an exemplary embodiment, the identity list may be null that means no UE-to-UE event monitoring configuration for this UE. In this case, the network exposure node such as SCEF (or NEF) may retrieve a notification destination and routes reporting of the monitoring event to the SCS/AS identified by this notification destination.

In block 308, the network exposure node transmits a report for the monitoring of the event in a second monitoring message to the determined second network node. In an exemplary embodiment, the report for the monitoring of the event may be contained in a light weight machine to machine (LwM2M) message. The second monitoring message may be a Mobile Terminate NIDD submit request which contains the LwM2M message or any other proper message which can transmit report for the monitoring of the event between the determined second network node and the network exposure node.

Figure 4:
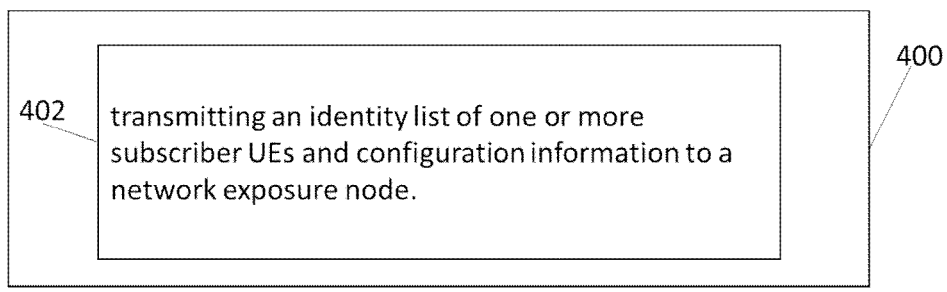
FIG. 4 is a flowchart illustrating a method according to an embodiment of the present disclosure.

FIG. 4 is a flowchart illustrating a method 400 according to some embodiments of the present disclosure. The method 400 illustrated in FIG. 4 may be performed by a server or an apparatus communicatively coupled to the server. In accordance with an exemplary embodiment, the server may be a SCS/AS (such as SCS/AS 104, 205), an AF or any other suitable network function or entity communicated with the network exposure node (such as SCEF 103, 203 or NEF).

According to the exemplary method 400 illustrated in FIG. 4, the server transmits an identity list of one or more subscriber UEs which have subscribed to monitoring of an event, and configuration information for the one or more subscriber UEs in a first request message to a network exposure node, as shown in block 402. The identity list of one or more subscriber UEs and the configuration information can be stored by the network exposure node. Wherein the configuration information comprises NIDD configuration information which enables the network exposure node to perform the NIDD function. The identity list of one or more subscriber UEs and configuration information enables the network exposure node to determine a subscriber MME/SGSN associated with a subscriber UE via which a report of the monitoring event can be sent to the subscriber UE. According to some exemplary embodiments, the first request message may be a monitoring request or any other proper message communicated between the first network node and the network exposure node.

The various blocks as shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
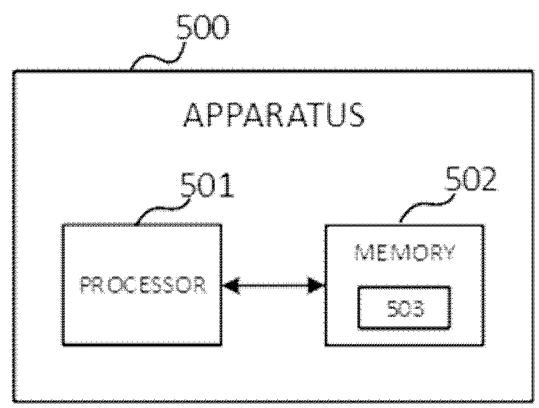
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a network exposure node as described with respect to FIG. 3, a server as described with respect to FIG. 4.

In some implementations, the one or more memories 502 and the computer program codes 503 may be configured to, with the one or more processors 501, cause the apparatus 500 at least to perform any operation of the method as described in connection with FIG. 3. In some implementations, the one or more memories 502 and the computer program codes 503 may be configured to, with the one or more processors 501, cause the apparatus 500 at least to perform any operation of the method as described in connection with FIG. 4.

Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6:
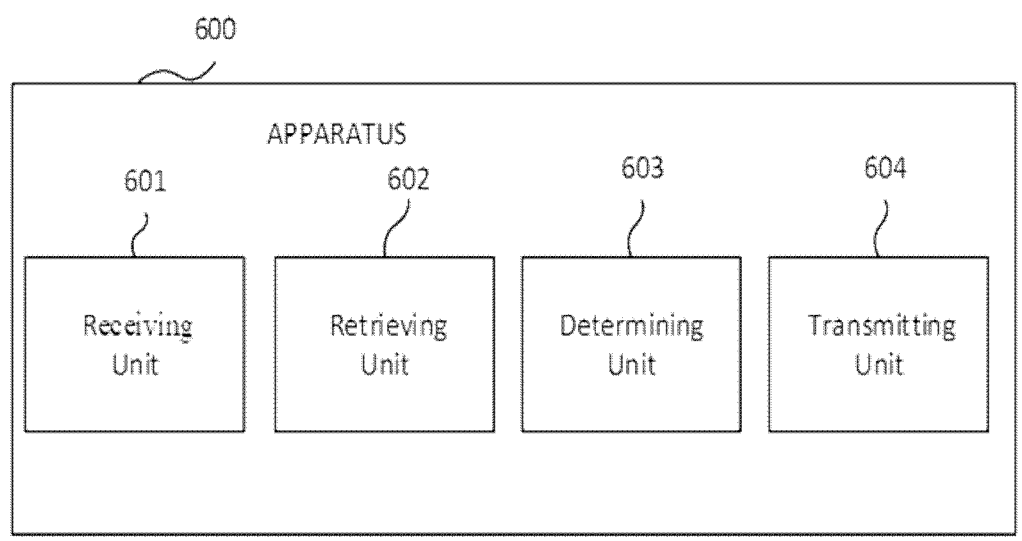
FIG. 6 is a block diagram illustrating an apparatus according to some embodiments of the present disclosure.

FIG. 6 is a block diagram illustrating an apparatus 600 according to some embodiments of the present disclosure. The apparatus 600 may be implemented as a network exposure node or as a part of the network exposure node. As shown in FIG. 6, the apparatus 600 comprises a receiving unit 601, a retrieving unit 602, a determining unit 603 and a transmitting unit 604. In an exemplary embodiment, the apparatus 600 may be implemented in a network exposure node such as a SCEF or a NEF. The receiving unit 601 is operable to carry out the operation in block 302, and the retrieving unit 602 is operable to carry out the operation in block 304, The determining unit 603 is operable to carry out the operation in block 306, and the transmitting unit 604 is operable to carry out the operation in block 308. Additionally or alternatively, receiving unit 601, a retrieving unit 602, a determining unit 603 and/or a transmitting unit 604 may be operable to carry out more or less operations to implement the proposed methods according to the exemplary embodiments of the present disclosure.

Figure 7:
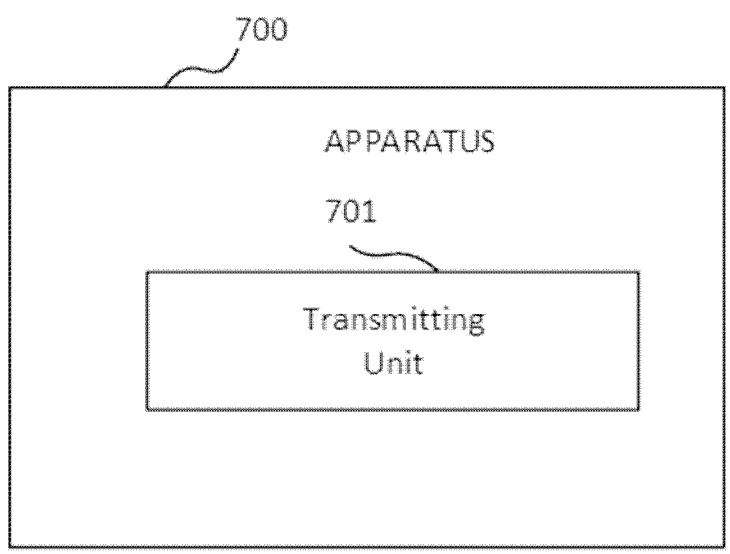
FIG. 7 is a block diagram illustrating an apparatus according to some embodiments of the present disclosure.

FIG. 7 is a block diagram illustrating an apparatus 700 according to some embodiments of the present disclosure. The apparatus 700 may be implemented as a server or as a part of the server. As shown in FIG. 7, the apparatus 700 comprises a transmitting unit 701. In an exemplary embodiment, the apparatus 700 may be implemented in a server such as a SCS/AS (or AF). The transmitting unit 701 may be operable to carry out the operation in block 402. Optionally, the transmitting unit 701 is operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method in a network exposure node, for event monitoring, comprising:
receiving a reference identity for the network exposure node in a first monitoring message from a first network node;
receiving monitoring indication from at least one of a source mobile management entity, MME, a source serving general packet radio service support node, SGSN, and a home subscriber server, HSS, the at least one of the MME, SGSN, and HSS containing the reference identity;
retrieving, based on the reference identity for the network exposure node, an identity list of one or more subscriber user equipment, UEs, which have subscribed to monitoring of an event, and configuration information for the one or more subscriber UEs, which are stored by the network exposure node;

retrieving non-Internet Protocol data delivery, NIDD, configuration information based on the reference identity;

determining, based on the identity list and the configuration information, a second network node associated with a subscriber UE in the identity list; and transmitting a report for the monitoring of the event in a second monitoring message to the determined second network node;

determining at least one of an MME and SGSN associated with the subscriber UE in the identity list; and transmitting a mobile terminated NIDD submit request to the determined at least one of the MME and the SGSN enabling the subscriber UE to transmit the reporting of monitoring event to one or more subscriber UEs without a service capability server/application server, SCS/AS.

2. The method according to claim 1, wherein the configuration information comprises non Internet Protocol, IP, data delivery, NIDD, configuration information to enable the network exposure node to perform NIDD.

3. The method according to claim 1, wherein the first monitoring message comprises a monitoring indication.

4. The method according to claim 1, wherein the second monitoring message comprises a mobile terminated, MT, NIDD submit request, wherein the MT NIDD submit request contains a light weight machine to machine, LwM2M, message which contains the report for the monitoring of the event.

5. The method according to claim 1, further comprising, prior to receiving the reference identity for the network exposure node:
  receiving the identity list and the configuration information, from a server, in a first request message; and
  storing the identity list and the configuration information in the network exposure node.

6. The method according to claim 5, wherein the first request message comprises a monitoring request.

7. The method according to claim 1, wherein the first network node comprises any of a mobility management entity, MME, a serving general packet radio service, GPRS, support node, SGSN, an access
  and mobility management function, AMF, a home subscriber server, HSS or a unified data management, UDM.

8. The method according to claim 1, wherein the first network node is an HSS or a UDM.

9. The method according to claim 8, further comprising: transmitting the reference identity for the network exposure node, in a second request message to the first network node to configure the monitoring event.

10. The method according to claim 9, wherein the second request message comprises a monitoring request.

11. The method according to claim 1, wherein the second network node comprises an MME, a SGSN or an AMF.

12. The method according to claim 5, wherein the server comprises any of a service capability server, SCS, an application server, AS, or an application function, AF.

13. The method according to claim 1, wherein the network exposure node comprises a service capability exposure function, SCEF, or network exposure function, NEF.

14. A network exposure node comprising:
  a transceiver, a processor and a memory, the memory comprising instructions executable by the processor whereby the processor is operative to:
    receive a reference identity for the network exposure node in a first monitoring message from a first network node;
    receive monitoring indication from at least one of a source mobile management entity, MME, a source serving general packet radio service support node, SGSN, and a home subscriber server, HSS, the at least one of the MME, SGSN, and HSS containing the reference identity;
    retrieve, based on the reference identity for the network exposure node, an identity list of one or more subscriber user equipment, UEs, which have subscribed to monitoring of an event, and configuration information for the one or more subscriber UEs, which are stored by the network exposure node;
    retrieve non-Internet Protocol data delivery, NIDD, configuration information based on the reference identity;
    determine, based on the identity list and the configuration information, a second network node associated with a subscriber UE in the identity list; and
    transmit a report for the monitoring of the event in a second monitoring message to the determined second network node;
    determine at least one of an MME and SGSN associated with the subscriber UE in the identity list; and
    transmit a mobile terminated NIDD submit request to the determined at least one of the MME and the SGSN enabling the subscriber UE to transmit the reporting of monitoring event to one or more subscriber UEs without a service capability server/application server, SCS/AS.

* * * * *